United States Patent [19]

Zwack

[11] Patent Number: 5,052,028
[45] Date of Patent: Sep. 24, 1991

[54] METHOD FOR SYNCHRONIZING THE PHASE OF CLOCK SIGNALS OF TWO CLOCK GENERATORS IN COMMUNICATIONS NETWORKS

[75] Inventor: Eduard Zwack, Puchheim, Fed. Rep. of Germany

[73] Assignee: Siemens Aktiengesellschaft, Munich, Fed. Rep. of Germany

[21] Appl. No.: 499,770

[22] Filed: Mar. 27, 1990

[30] Foreign Application Priority Data

Mar. 31, 1989 [EP] European Pat. Off. ........ 89105713.5

[51] Int. Cl.$^5$ ............................................. H03B 19/00
[52] U.S. Cl. ..................................... 375/109; 331/49; 370/103; 455/51; 455/71
[58] Field of Search ............... 375/106, 107, 109, 119, 375/120; 370/100.1, 103; 455/51, 69, 71; 331/1 A, 18, 28, 49

[56] References Cited

U.S. PATENT DOCUMENTS

| | | | |
|---|---|---|---|
| 3,453,592 | 7/1969 | Ishii et al. | 375/109 |
| 3,541,552 | 11/1970 | Carlson | 375/107 |
| 3,560,869 | 2/1971 | Miller | 375/107 |
| 3,801,981 | 4/1974 | Alpers | 375/109 |
| 3,862,365 | 1/1975 | Kobayashi et al. | 455/51 |

OTHER PUBLICATIONS

"A Microprocessor-Controlled Phase Locked Loop for Network Synchronization", Proceedings 1979 IS-CAS, pp. 804-805.

Primary Examiner—Benedict V. Safourek
Attorney, Agent, or Firm—Hill, Van Santen, Steadman & Simpson

[57] ABSTRACT

Method for synchronizing the phase of clock signals of two clock generators in communications networks. Using the present method, the phase relations of clock signals that are derived from oscillator clock signals in two clock generators are synchronized such that the phase relations of the clock signals coincide regardless of the distance between the two clock generators. To this end, one clock generator is defined as a reference clock generator and reference clock signals formed therein are communicated to the other further clock generator. In the latter, the generated further clock signals are synchronized with the incoming reference clock signals and the clock signals synchronized in this fashion are forwarded to the reference clock generator. In the latter, the phase deviation of the internally formed clock signals and of the incoming clock signals is measured and correction information is formed and forwarded to the other further clock generator. The phase relation of the clock signals is corrected in the other further clock generator in conformity with the correction information.

29 Claims, 2 Drawing Sheets

5,052,028

METHOD FOR SYNCHRONIZING THE PHASE OF CLOCK SIGNALS OF TWO CLOCK GENERATORS IN COMMUNICATIONS NETWORKS

BACKGROUND OF THE INVENTION

Clock generators are provided in individual components of digital communications networks such as, for example, switching and transmission equipment for the time-related switching and transmission of the digital information. The clock signals required for the time-related control of the respective equipment are generated in these clock generators.

For plesiochronic operation of the communications network, clock signals that are extremely accurate in bit rate and that are stable over a long term must be formed in the individual clock generators. Although this operating mode requires an extremely high outlay per clock generator, it permits extremely flexible and wide-ranging network formatting.

A highly accurate, outage-protected clock generator is centrally installed in synchronously operated communications networks. The clock signals generated in this clock generator are communicated to all components of the communications network via transmission-oriented equipment together with digital information, for example, voice information. Respective clock signals whose phases coincide with the phases of incoming, highly accurate clock signals are generated in the components using clock generator equipment equipped with phase-locked loops. Such a clock generator having a phase-locked loop is known from the periodical "Proceedings of 1979 ISCAS", Pages 804, 805 "A Microprocessor-Controlled Phase-Locked Loop For Network Synchronization". A time-related handling of the digital information is guaranteed in the individual network components by these clock generators. Compared to plesiochronic operation of a communications network, the outlay per clock generator in view of clock precision and, in particular, long-term stability is lower for synchronous operation; however, this involves a more complicated transmission technology and a spatially limited network structure.

Outage-protected clock generators are provided in network nodes, particularly digital switching equipment, for both plesiochronic operation and synchronous operation of a communications network. To this end, two identically structured clock generators, i.e. clock generators equipped with phase-locked loops, are provided, whereby the clock signals of one clock generator (also referred to hereinafter as a first reference clock generator which provides "first reference clock signals") are synchronized to the incoming, highly accurate clock signals and the clock signals of another clock generator (also referred to hereinafter as a second clock generator which provides "second clock signals") are synchronized to the reference clock signals formed by the reference clock generator. An automatic switch to the second clock generator is usually undertaken for outage of the first reference clock generator. Since both clock generators are located, for example, in switching equipment which is frequently spaced some distance from one another, for example, in different cabinet racks, the phase relations of the clock signals generated in the two clock generators deviate in communications networks having high processing speeds, that is, clock signals with high bit rates, due to signal running times via connections between the clock generators. Given an outage of the first reference clock generator, these phase deviations cause considerable disturbances after switching to the second clock generators, particularly for digital information switching and transmission. Particularly in digital data transmission, this can lead to transmission delays and, under certain conditions, to abnormal connection termination.

SUMMARY OF THE INVENTION

An object of the present invention is to provide a method with which two clock generators can be controlled regardless of the distance between them such that the phases of the respective clock signals generated in the clock generators coincide. This object is achieved by a method for synchronizing the phase or frequency of digital second oscillator clock signals that are formed in an oscillator clock means of a second clock generator means, with digital first reference oscillator clock signals that are formed in a reference oscillator clock means of a first reference clock generator means, whereby first reference clock signals or, respectively, second clock signals having a lower frequency are derived in the first reference clock generator means or, respectively, in the second clock generator means from the first reference oscillator clock signals or, respectively, second oscillator clock signals with the assistance of a respective pulse means and a reference processor means or, respectively, second processor means, whereby defined signal edges represent the phase relation of the first reference oscillator clock signals or, respectively, second oscillator clock signals, whereby the second oscillator clock signals are synchronized in view of their phase or frequency first with reference clock signals communicated to the second clock generator means from the first reference clock generator means, being synchronized thereto in the second clock generator means with the assistance of a phase-locked loop formed by a phase measuring means, and by a control means, whereby the phase deviations between the first reference clock signals and the second clock signals communicated to the first reference clock generator means via at least one connecting line are measured and control information is formed in the first reference clock generator means using a control circuit in its control means formed of a phase measuring means and of a means for processing, the control circuit also having a delay means, with which control information at least one further delay means that is controllable in terms of its delay time and that is inserted into at least one connecting line for communicating the first reference clock signals or, respectively, second clock signals is controlled such that the phase deviations between the first reference clock signals and the second clock signals correspond to an n-fold period duration of the first reference oscillator clock signals, whereby correction information measured in "n" period durations and representing a phase deviation between the first reference clock signals and the second clock signals measured within the $n^{th}$ period duration is formed in the control means of the first reference clock generator means and is forwarded to the second clock generator means, whereby the phase relations of the first reference clock signals and the second clock signals are corrected in the second clock generator means using its control means according to the communicated correction information.

The crucial idea of the present invention is that a phase-locked loop is provided in the first reference clock generator in addition to a phase-locked loop in the second clock generator for synchronizing the clock signals to the reference clock signals. A delay means inserted into at least one connecting line is at least set by the phase-locked loop in the first reference clock generator until a phase deviation corresponding to an n-fold period duration of the reference oscillator clock signals is reached. This setting quantity of the delay line that indicates the phase deviation within the $n^{th}$ oscillator clock signal and the phase deviation in n period durations of oscillator clock signals together form a correction information that is communicated to the second clock generator. The phases of the clock oscillator signals are corrected in the second clock generator in accordance with the phase deviations indicated in the correction information.

A critical advantage of the method of the present invention is the use of the method for synchronizing clock signals with the phase-locked loops in both clock generators. As a result thereof, proven circuit realizations and, given utilization of a microprocessor, proven program realizations can be co-involved in the realization of the present invention.

The method of the present invention is utilized with especial advantage in a digital communications switching. Clock generators can thereby accommodate equipment locally separated from one another, for example, in different cabinet racks. As a result a flexible, modular mechanical structure of digital telecommunications switching systems becomes possible.

In a further, advantageous development of the method of the present invention, correction information is communicated by pulse duration or pulse pause modulation of the reference clock signals. This means that the measured phase deviations between the clock signals of the two clock generators are indicated by the pulse duration or pulse pause of the reference clock signals. On the basis of a measurement of pulse duration or pulse pause of the reference clock signals communicated to the second clock generator, the phase deviation therein is identified and the phase of the clock signals is correspondingly controlled. As a result of this especially advantageous pulse duration or pulse pause modulation of the reference clock signals, these can be communicated from the first reference clock generator to the second clock generator together with the correction information via a single connection.

Alternatively, the correction information can be respectively communicated by "m"-coded pulse duration or pulse pause modulated reference clock signals. This measure is especially advantageous when the pulse duration or pulse pause modulation steps are not adequate for represerving the required phase deviation values. Defined pulse durations or pulse pauses are thereby allocated to prescribed logical values, for example, logical "1" or "0". In conformity with the selected code, for example, a ten-place binary code, ten reference clock signals are coded according to the currently existing phase deviation and are communicated to the second clock generator. These ten reference clock signals are received in the second clock generator and are decoded according to the selected coding. The decoded information then represents the phase deviation of the two clock signals measured in the first reference clock generator.

In a further advantageous development of the method of the present invention, the reference oscillator clock signals are synchronized in terms of their phase or, respectively, frequency with network clock signals sent to the first reference clock generator, being synchronized with reference clocks by using an additional reference phase-locked loop. This synchronization of the reference clock signals to the network clock signals is provided for the first reference clock generators in synchronously operated communications networks, whereby the network clock signals are distributed to the first reference clock generators of the network components, for example, telecommunications exchanges, from a higher-ranking, central, high-precision clock means with a suitable transmission technology, for example, PCM transmission technology.

Using the afore-mentioned phase-locked loops in the two clock generators, a higher control speed is provided for the phase-locked loop in the second clock generator in comparison to that in the first reference clock generator and a higher control speed is provided for the phase-locked loop in the first reference clock generator compared to the reference phase-locked loop. These relationships of the control speeds of the phase-locked loops are especially advantageous since instabilities, particularly resonant tendencies, are thereby avoided.

In order to keep the outlay for matching the frequency of the clock signals to the control speed of the phase-locked loops as low as possible, it is especially advantageous to tune the frequency of the clock signals to the control speed of the phase-locked loops. As a result, additional frequency dividers or, respectively, frequency multiplier means can be eliminated.

In a further advantageous development of the method of the present invention, the reference clock signals and clock signals have their frequency tuned to a standardized frame or, respectively, synchronization clock that is provided for a PCM-suited processing or, respectively, transmission of information. The respective clock signals derived from the oscillator clock signals thereby represent the frame clock information, for example a 32 channel frame clock of a PCM processing clock having 2 Mbit/s. This means that additional outlay for matching the frequency of the clock signals to the frequency of the PCM frame clock or for the derivation thereof from the oscillator clock signals is avoided.

In a further advantageous development of the present invention, the arrangement for the implementation of the method can be utilized both as first reference clock generators and second clock generators. This is partly achieved in that memory means are provided in the first and second pulse duration modulation measuring equipment as well as in the phase measuring equipment, setting information or measured result information communicated from the control means being stored in these memory means and parts of the arrangement of the present invention being capable of being deactivated using the stored setting information or measured result information. For example, the information stored in a memory means can set the delay means to a transit time of 0ms and, thus, can deactivate it. A further, significant advantage of the arrangement of the present invention is that the oscillator clock signals formed by the clock oscillator are continuously counted using a counter means and the count results available in parallel at the outputs of the counter means are utilized both in the first and second pulse duration modulation means for forming the pulse duration modulated clock signals and are also utilized in the phase measuring means. Circuitry can be saved by the multiple utilization of the counter means. Further, the count results are present in digital form, for example, as binarily coded, digital signals. The counter results are therefore especially suited for further, digital processing in hardware and software components.

In a further advantageous development of the arrangement of the present invention, the delay means is inserted into one of the two connecting lines or is symmetrically distributed into both connecting lines in the first reference clock generator and/or the second clock generator. As a result of the symmetrical division, the same control range of delay times as for a single, extensive delay means can be achieved by utilizing a plurality of smaller, identically constructed delay means. The delay times are thereby identified by the control means directly or by an information transmission, for example, at the second clock generator, and are set via a memory means provided for this purpose.

A delay means whose delay time can be controlled is realized in an especially advantageous way by serially switchable gates of integrated circuits. The plurality of gates connected in series, each of these respectively having a known transit time or delay time, is thereby controlled by the control means via a memory means. A plurality of gates corresponding in number to the binary information can be connected in series on the basis of this measure, for example by forming a binarily coded information.

During the specially advantageous provision of two delay means, a trigger circuit and three memory means, the delay times of the first delay means can be set, on the one hand, by the control means and, on the other hand, the results of the phase measurement that are present in n period durations of oscillator clock signals and in a plurality of parts of a period duration of an oscillator clock signal can be transmitted to the control means. The second delay means can in turn be formed by serially connected gates, whereby the outputs of the gates are respectively connected to the inputs of a control means.

In a further advantageous development of the arrangement of the present invention, a positive and a negative comparator means are arranged in the second pulse duration modulation means, the respectively first comparator inputs thereof being connected to respectively one memory means and the second comparator inputs thereof being connected to the outputs of the counter means. The output of the negative comparator means is connected to the setting input of a second trigger circuit that forms the pulse duration modulated clock signals. The output of the positive comparator means is connected to a reset input of the second trigger circuit. As a result of this provision of the comparator and memory means as well as of the second trigger circuit, the polarity changes of the pulse duration modulated clock signals to be formed can be arbitrarily varied in view of their temporal appearance. This means that the clock signals can be sent out at arbitrary times, i.e. can be arbitrarily varied in terms of their phase relation, and the pulse durations of the clock signals that represent the correction information can be arbitrarily set.

A further advantageous development of the present invention is that the delay means can be formed by a delay chain whose individual delay elements are realized by n-channel and p-channel field effect transistors and inverters. A delay chain fashioned in this way is disclosed by European Patent Application 0 274 606 (published on July 20, 1988 and hereby incorporated by reference). The delay time of the signals due to the delay chain is varied by applying a DC voltage or by applying smoothed, pulse duration modulated signals to the gate terminals connected to one another in the delay chain. When, in addition to the delay chain, a phase comparison element is also implemented in the integrated circuit, the generated reference clock signals can be synchronized in the first reference clock generator with the incoming clock signals and the phase deviations can be simultaneously identified. The level of the smoothed, pulse duration modulated signals present at the output of the phase comparison element thereby represents the current phase deviation of the two clock signals. The level value must be subsequently converted into digital information for further processing in the control means. For example, this conversion can be accomplished with commercially available analog-to-digital converter means. The additional provision of the phase comparison element in the integrated circuit is likewise disclosed by European Patent Application 0 274 606.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
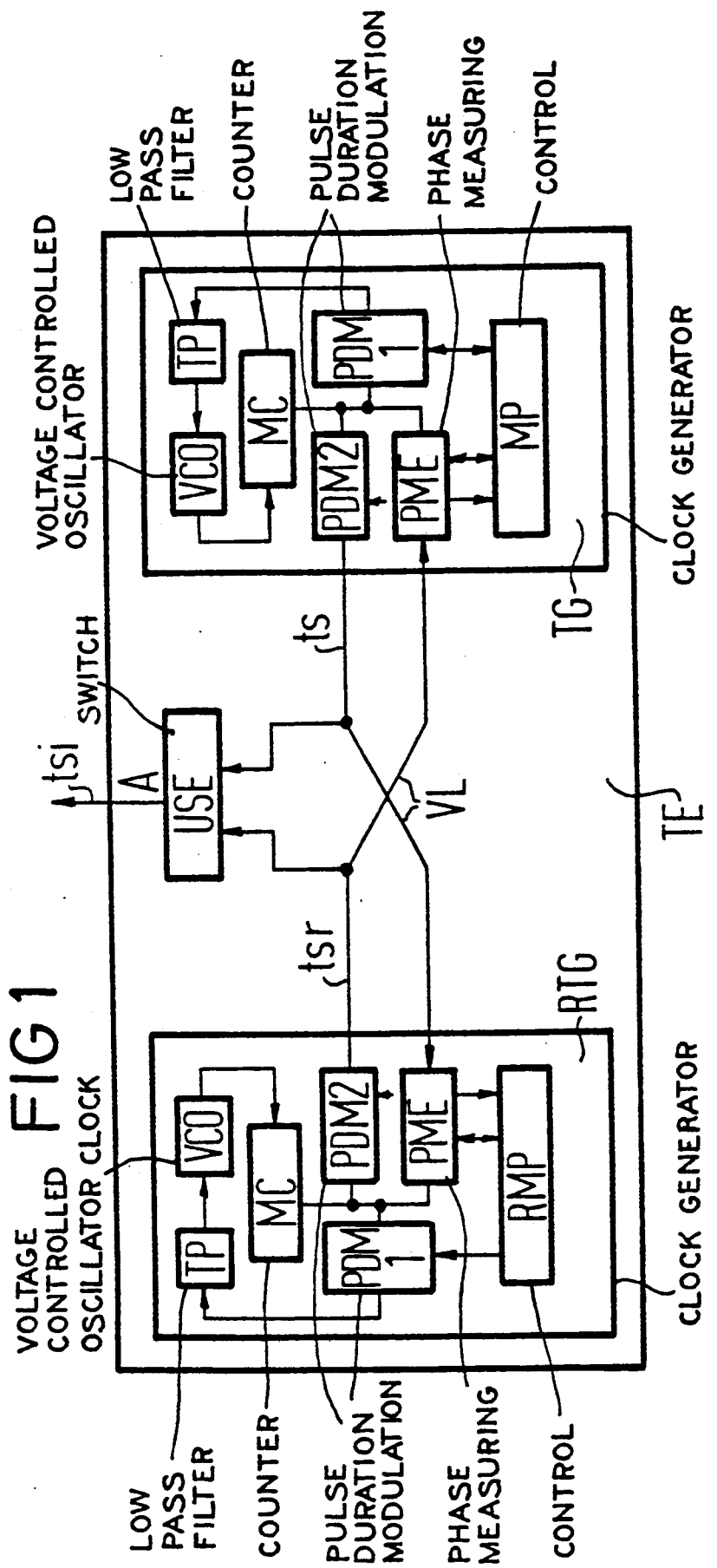
FIG. 1 is a block diagram of an outage-protected clock means formed of a first reference clock generator and of a second clock generator means.

FIG. 1 shows an outage-protected clock means TE that is formed of a first reference clock generator means and of a second clock generator means RTG, TG. For example, the clock means TE is located in a switching equipment of a communications network. The clock signals tsi required for a time-related switching of the information incoming to the switching equipment are thereby generated in the clock means TE. The clock signals tsi formed in this fashion are distributed to all components of the switching system and, for example, are synchronized switching system components with the processing clock signals.

The clock means TE is constructed of two identically realized clock generator means RTG, TG. Clock signals tsr, ts are formed in both clock generator means RTG, TG and are conducted to a switch-over means USE. For an outage of a clock generator means RTG, TG or, respectively, of the clock signals tsr, ts, a switch to the respectively other clock generator means RTG, TG or, respectively, clock signals tsr, ts is effected by the switch-over means USE. The outage-protected clock signals tsi are available at the output A of the switch-over means USE and, for example, are forwarded to the system components of a switching equipment.

Reference clock signals tsr are formed in the clock generator means RTG, referred to below as a first reference clock generator means RTG, and are communicated to the other second clock generator means TG. The clock signals ts that have been formed are synchronized in the second clock generator means TG with the incoming reference clock signals tsr in terms of their phase relation and are sent to the first reference clock generator means RTG.

The clock generator means RTG, TG are each respectively formed by an identically realized DC-controlled oscillator clock means VCO, by a counter means MC, by first and second pulse duration modulation means PDM1, PDM2, by a phase measuring means PME and by a control means RMP, MP.

Figure 2:
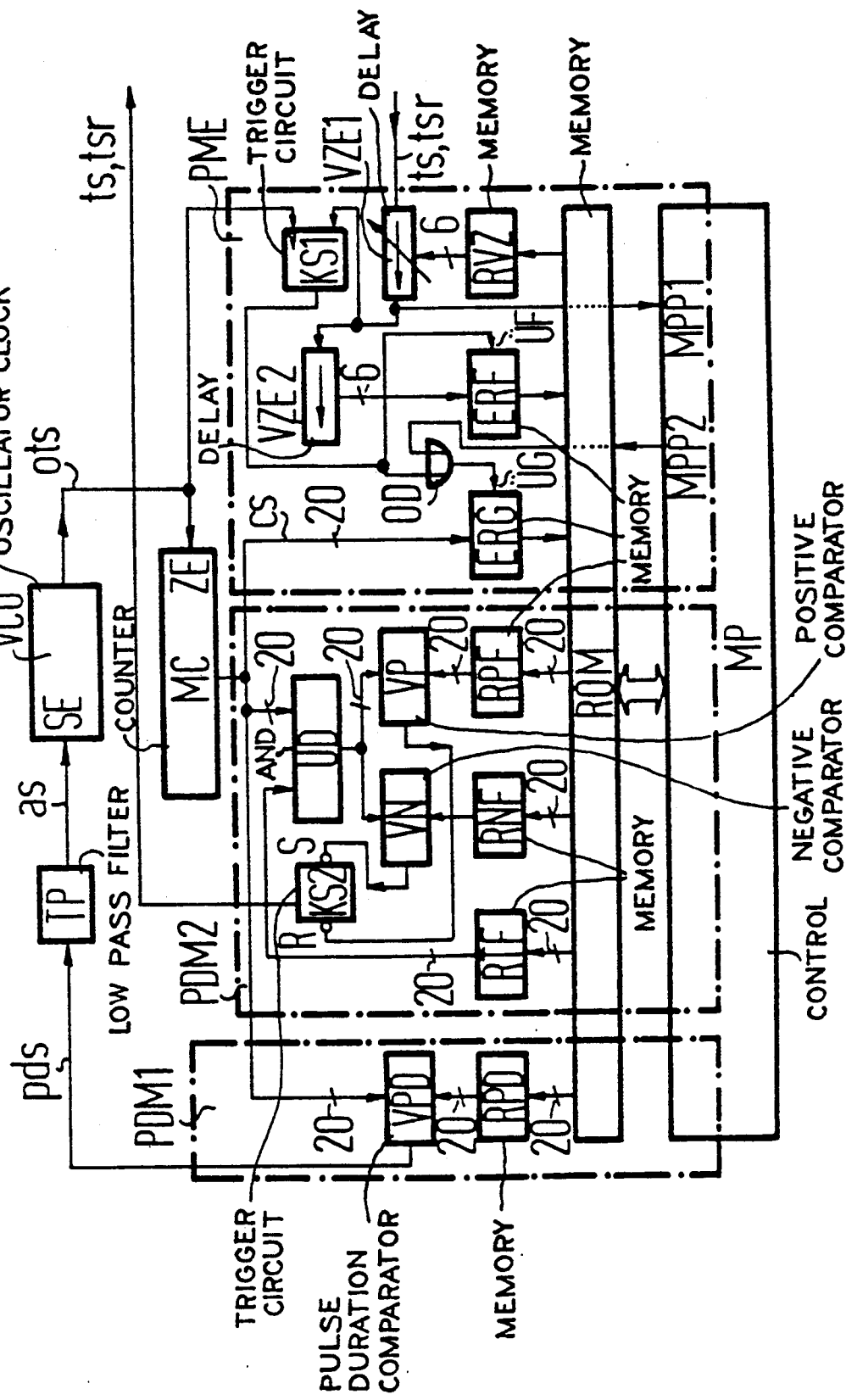
FIG. 2 is a block diagram of a first reference clock generator and a second clock generator.

FIG. 2 shows a block diagram of a reference clock generator means or, respectively, clock generator means RTG, TG wherein the circuit components of the first and second pulse duration modulation means PDM1, PDM2 and of the phase measuring means PME are shown in detail. The measurement or, respectively, result information communicated from the individual pulse duration modulation means PDM1, PDM2, and phase measuring means PME are evaluated and processed in a central control means MP and calculated setting information is sent to the corresponding means PDM1, PDM2, PME. The central control means MP, for example, can be an 8-Bit microprocessor SAB 8051 of Siemens AG. The setting, measured and result information are exchanged between the central control means MP and the means PDM1, PDM2, PME via an intermediate memory means ROM. This intermediate memory means ROM can be commercially available ROM (read-only memory) memory modules. The access of the central control means MP to the intermediate memory means ROM for the purpose of reading and storing information occurs with standardized methods implemented in the control means MP. The setting information is sent from this intermediate memory means ROM to memory means RPD, RTF, RMF, RPF, RVZ in the means PDM1, PDM2, PME or, respectively the measurement and result information is sent thereto from memory means ERG, ERF in the means PDM1, PDM2, PME.

In addition to the components already set forth, a voltage-controlled oscillator means VCO, a counter means MC and a low-pass filter means TP are included in the clock generator means TG. For example, the oscillator means VCO is composed of an integrated crystal oscillator circuit as well as of a pulling circuit with which the oscillator frequency can be controlled within prescribed limits. Since the pulling circuit is usually formed by capacitor diodes, frequency variation is achieved by varying a DC voltage applied to a voltage input SE of the oscillator means VCO. This DC voltage or drive voltage, as, is formed in the low-pass filter means TP with the pulse duration modulated signals, pds, incoming thereto. For example, the low-pass filter means TP is formed by a low-pass filter constructed of a resistor and of a capacitor. The pulse duration modulated signals, pds, are generated in a first pulse duration modulation means PDM1. The oscillator clock signals, ots, generated in the oscillator means VCO are sent to a counting input ZE of the counter means MC. For example, the communicated oscillator clock signals, ots, are continuously counted in binary fashion in the counter means MC by a twenty-bit synchronous counter and the binarily coded counter results, cs, are respectively available at, for example, 20 parallel counter outputs. These counter results, cs, an the outputs of the counter means MC represent the time base of a clock generator means TG and are sent to the first and second pulse duration modulation means PDM1, PDM2 and to the phase measuring means PME.

In the first pulse duration modulation means PDM1, the counter results, cs, are sent to first 20 inputs of a pulse duration comparator VPD. The second 20 inputs of the pulse duration comparator VPD are connected to a pulse duration memory means PRD. By continuous comparison of the information present at the two 20-bit inputs, pulse duration modulated signals, pds, are formed in the pulse duration comparator VPD and are sent to the low-pass filter means TP via an output of the pulse duration comparator VPD.

In the second pulse duration modulation means PDM2, the counter results, cs, are conducted to 20 first inputs of a 20 bit AND logic element UD. The information stored in a divider memory means RTF is sent to 20 second inputs of the 20-bit AND logic element UD. How frequently the counter results, cs, are forwarded to the output of AND logic element UD is determined by this AND logic element UD. The frequency of occurrence and, thus, the frequency of the forwarding of the counter results is determined by the information stored in the divider memory means RTF. The 20 outputs of the AND logic element UD are sent in parallel to respectively 20 inputs of a negative comparator VN and 20 inputs of a positive comparator VP. The 20 second inputs of the negative comparator VN are connected to the 20 outputs of a negative memory means RNF. Analogously thereto, the 20 second inputs of the positive comparator VP are connected to 20 outputs of a positive memory means RPF. The setting information to be stored in the two memory means RNF, RPF are communicated thereto by the control means MP via the intermediate memory means ROM. By continuous comparison of the information respectively present at the 20 inputs, a polarity change to a positive voltage is indicated in the positive comparator VP and a polarity change to a negative voltage is indicated in the negative comparator VN and is respectively communicated to the outputs of the comparators VN, VP. The output of the positive comparator VP is sent to a reset input R and the output of the negative comparator VN is sent to a setting input S of a second trigger circuit KS2. For example, this second trigger circuit KS2 is realized by a RS trigger circuit of a standard integrated circuit having a setting and resetting input SR. Positive or, respectively, negative voltage is applied to the output of this second trigger circuit KS2 with information indicating the polarity change. The output of this second trigger circuit KS2 represents the output of the second pulse duration modulation means PDM2 at which either the reference clock signals, tsr, or the clock signals, ts, are available depending upon whether this generator is a first reference clock generator means RTG or a second clock generator means TG.

In the phase measuring means PME, the counter results, cs, are sent to 20 inputs of a macrophase memory means ERG. In this macrophase memory means ERG, the phase deviations in n period durations (n may only assume whole-numbered values) of the oscillator clock signals, ots, of the incoming clock signals, ts, relative to the internal clock signals, tsr, are formed, stored and communicated to the control means MP via the intermediate memory means ROM. At what times the counter results, cs, are to be transferred into the macro phase memory means ERG is defined by appropriate application of information, for example, a briefly positive voltage, to a transfer input of the macro phase memory means ERG. This information that defines the transfer time is provided by a first trigger circuit KS1 and is sent via the output thereof and via an OR logic element OD to the transfer input ÜG of the macro phase memory means ERG. The oscillator clock signals, ots, formed in the oscillator means VCO are sent to a clock input of this first trigger circuit KS1. The reference clock signals or, respectively, clock signals, ts, tsr, sent via a first delay means VZE1 to an input, for example, D-input, of the first trigger circuit KS1. The output of this first trigger circuit KS1 is additionally sent to the transfer input ÜF of a second fine-phase memory means ERF. For example, the first delay means VZE1, VZE2 can be realized by a series circuit of gates of standard integrated circuits. Smaller groups of serially connected gates can thereby be formed such that the number of gates of the individual groups corresponds to the binary values, for example, with groups of 1, 2, 4, 8 gates, etc. An arbitrary plurality of gates can be serially connected in succession with the insertion of a suitable drive logic by applying n-place binary information, for example, six-place. Let it be assumed in the exemplary embodiment that six-place binary information is stored in a delay memory means RV which is used to control the first delay means VZE1 via six connections that a plurality of gates corresponding in number to the binary information are connected in series, a maximum of, for example, 64. How many gates are to be connected in series or, respectively, what information has to be stored in the delay memory means RVZ is determined by the control means MP and is communicated to the delay memory means RVZ via the intermediate memory means ROM. The output of the first delay means VZE1 is additionally sent to an input of a second delay means VZE2 and is simultaneously sent to an input or, port MPP1 of the control means MP. The clock signals, ts, tsr, sent from the first delay means VZE1 are sent to the input of the second delay means VZE2 which is structured as a delay chain. The delay chain is in turn formed by serially connected gates of standard integrated circuits. Let it be assumed for the exemplary embodiment that 20 gates are connected in series and that the outputs of the gates are each respectively sent to the inputs of a fine-phase memory means ERF. The time at which the information pending at the 20 inputs of the fine-phase memory means ERF are transferred thereinto is defined by sending corresponding information to the transfer ÜF of the fine-phase memory means ERF. The clock signals, ts, tsr, incoming at the input of the delay chain passes through this delay chain, whereby a defined, chronological delay is effected by each gate. The clock signal, ts, tsr, simultaneously pends at the D-input of the first trigger circuit KS1. The next polarity change of the oscillator signals, ots, on the clock input of the first trigger circuit KS1 causes the information on the inputs of the fine-phase memory means ERF to be transferred at exactly this time. The plurality of traversed gates of the polarity change of the clock signals, ts, tsr, indicates the phase deviation within a period duration of an oscillator clock signal, ots. If, for example, the information was transferred into the fine-phase memory means ERF at the time at which the plurality change of the clock signal, ts, tsr, has traversed ten gates, then the phase deviation of the incoming clock signals, ts, from the internally formed clock signal, ts, amounts to ten gate transit times. For a gate transit time of, for example, 5 ns, the phase deviation is approximately 50 ns. The plurality of gates can be increased further; however, the outputs of the gates are to be sent via corresponding coding logic, for example, binary coding logic. What is thereby achieved is that, for example, the information of 64 gate outputs can be communicated in binarily coded form to the fine-phase memory means ERF via six binarily coded lines. In order to be able to control the transfer input ÜG of the macro phase memory means ERG given the appearance of a polarity change of the clock signal, ts, tsr, which also indicates the pulse duration from the control means MP. The output or port MPP2 of the control means MP is connected to the second input of the OR logic element OD.

Therefore, the circuit arrangement for the implementation of the method of the present invention has, in a clock generator means (TGE), the output of a controllable-frequency, digital oscillator clock means (VCO) that forms the oscillator clock signals (OTS) connected to a clock input of a counter means (MTC); the counter outputs, on which the count results identified in the counter means (MC) are present, connected to first and second pulse duration modulation means (PDM1, PDM2) as well as to a phase measuring means (PME); the output of the first pulse duration modulation means (PDM1) connected via a low-pass filter means (TP) to a control input of the oscillator means (VCO); the second pulse duration modulation means (PDM2) having a clock signal output that provides the clock signals (ts); the phase measuring means (PME) provided with an input for incoming clock signals (ts); and memory means (RPD, RTF, RNF, RPF, ERG, ERF, RVZ), that respectively intermediately store the setting information or the identified information of the means, provided in the first and second pulse duration modulation means (PDM1, PDM2) and in the phase memory means (PME), the memory means being connected to a control means (MP) via a further intermediate memory (ROM).

The output of the second pulse duration modulation means (PDM2) of the clock generator means (TG), defined as reference clock generator means (RTG), is connected to the input of the phase measuring means (PMA) of a further clock generator means (TG) and the output of the second pulse duration modulation means (PDM2) of the further clock generator means (TG) is connected to the input of the phase measuring means (PME) of the reference clock generator means (RTG), the reference clock generator means and the further clock generator means being interconnected via connecting lines (VL). The delay means (VZ1) having a controllable delay time is inserted into one of the two connecting lines (VL) or is inserted symmetrically distributed into both connecting lines (VL) in the reference clock generator means and/or the clock generator means. The delay means (VZ1) is respectively realized as a delay line formed by a plurality of series connected gates of integrated circuits, whereby the number of gates to be respectively connected in series is controlled by the control means.

The first delay means (VZ1) connected to the clock signal input of the phase measuring means (PME) is located in the phase measuring means (PME). For the purpose of controlling the signal transit time of the delay means (VZ1), the latter is connected to an intermediate memory means (RVZ) that stores the controlling information. The output of the first delay means (VZE1) is connected to the input of a second delay means (VZE2) for the identification of the phase deviation within the $n^{th}$ period duration of an oscillator clock signal (ots), to an input of a first trigger circuit (KS1) and to an input (MPP1) of the control means (MP). The clock input of the first trigger circuit (KS1) is connected to the output of the oscillator clock means (VCO) and the output of the first trigger circuit (KS1) is connected via a logic element (OD) to a transfer input (ÜG) of a macro phase memory means (ERG) that intermediately stores "n" oscillator clock signal period durations. This output is also connected to a transfer input (ÜF) of a fine-phase memory means (ERF) that intermediately stores the phase deviation within the $n^{th}$ oscillator clock signal period duration. The outputs of the second delay means (VZE2) are connected to the inputs of the fine-memory means (ERF) and the inputs of the macro phase memory means (ERG) are connected to the counter outputs. An output (MPP2) of the control means (MP2) is connected to a second input of the logic element (OD).

A positive comparator and a negative comparator are located in the second pulse duration modulation means (PMD2), the respectively first comparator inputs thereof being connected to respective memory means (RMF, RPF) and the second comparator inputs thereof being connected to the outputs of the counter means (MC). The output of the negative comparator (RMF) is connected to the setting input (S) of a second trigger circuit (KS2) that forms the pulse duration modulated clock signals (ts) and the output of the positive comparator (VP) is connected to a reset input (R) of the second trigger circuit (KS2).

The delay means (VZ1, VZ2) are formed of a delay chain composed of a plurality of series connected delay elements. The delay elements are realized by n-channel and p-channel enhancement field effect transistors utilized in integrated CMOS circuit technology and of inverters formed therefrom. The input of the inverters is respectively connected to a gate terminal of an n-channel field effect transistor connected to negative supply voltage via the source terminal thereof and is connected to a gate terminal of a p-channel field effect transistor connected to positive supply voltage via the drain terminal thereof. The output is respectively connected to the as yet unwired drain or, respectively, source terminal of the respective field effect transistor. Every delay element is partially formed by a series connection of two inverters and, for the purpose of influencing its delay time, is inserted either between the p-channel field effect transistors and the positive supply voltage of a respectively further p-channel field effect transistor such that the source terminal of this p-channel field effect transistor is connected to the drain terminal of the p-channel field effect transistor of the inverters and the drain terminals being connected to the supply voltage, or is inserted between the n-channel field effect transistors and the negative supply voltage of a respective n-channel field effect transistor such that the drain terminal of this n-channel field effect transistor is respectively connected to the source terminal of the n-channel field effect transistor of the inverters, the source terminals being connected to the negative supply voltage, and the gate terminals being connected both to one another in a delay element as well as to all gate terminals of the respectively other delay elements. The delay elements are realized in an integrated circuit. The input and output of the delay chain and the connections between the elements of the delay chain are each respectively connected to a terminal provided for an external connection.

The delay chain is followed by a phase comparison element which is partially formed by two serially arranged inverters and is inserted in the second inverter element respectively between the supply voltage and the n-channel or, respectively, p-channel field effect transistors of two further n-channel or, respectively, p-channel field effect transistors serially in a drain-source or, respectively, source-drain direction. The gate terminals of the field effect transistors respectively following the n-channel or, respectively, p-channel field effect transistor of the second inverter element are fed back onto the input of the inverter. The gate terminals of the field effect transistors respectively connected to the supply voltage are connected to one another and to the output of the delay chain. A capacitor can be inserted between the output of the second inverter element that represents the output of the phase comparison element and the negative supply voltage. The output of the phase comparison element is directly connected to all gate terminals connected to one another in the delay elements and to a terminal provided for an external connection.

In summary the method of the present invention is for synchronizing the phase or, respectively, frequency of digital oscillator clock signals (ots) that are formed in an oscillator clock means (VCO) of a clock generator means (TG), with digital reference oscillator clock signals (tor, corresponding to signals, ots, in FIG. 2) that are formed in a reference oscillator clock means (RVCO, corresponding to means VCO in FIG. 2) of a reference clock generator means (RTG), whereby reference clock signals or, respectively, clock signals (tsr, ts) having a lower frequency are derived in the reference clock generator means or, respectively, in the clock generator means (RTG, TG) from the reference clock signals (tor) or, respectively, oscillator clock signals (ots) with the assistance of a respective pulse means and of a reference processor means (RMP) or, respectively, processor means (MP), whereby defined signal edges represent the phase relation of the reference oscillator clock signals (tor) or, respectively, oscillator clock signals (ots), whereby the oscillator clock signals (ots) are synchronized in view of their phase or, respectively, frequency with reference clock signals (tsr) communicated to the clock generator means (TG), being synchronized thereto in the clock generator means (TG) with the assistance of a phase-locked loop formed by a phase measuring means and by the control means (MP), whereby the phase deviations between the reference clock signals (tsr) and the clock signals (ts) communicated to the reference clock generator means (RTG) via a connecting line (VL) are measured and control information are formed in the reference clock generator means (RTG) with the assistance of a control circuit in the control means formed of a phase measuring means (MPE) and of the control means (RMP), said control circuit being formed of a control and delay means (VZE2), with which control information at least one further delay means (VZE1) that is controllable in terms of its delay time and that is inserted into at least one connecting line (VL) for communicating the reference clock signals or, respectively, clock signals (tsr, ts) is controlled such that the phase deviations between the reference clock signals (tsr) and the clock signals (ts) correspond to an n-fold period duration of the reference oscillator clock signals (ots), whereby correction information (ki) measured in "n" period durations and representing a phase deviation between the clock signals (ts, tsr) measured within the $n^{th}$ period duration is formed in the control means of the reference clock generator means (RTG) and is forwarded to the clock generator means (TG), whereby the phase relations of the clock signals (ts, tsr) are corrected in the clock generator means (TG) with the assistance of the control means (MP) according to the communicated correction information (ki).

Further in the method the correction information (ki) are communicated by pulse duration or pulse pause modulation of the reference clock signals (tsr). More specifically, the correction information (ki) are respectively communicated by "m" coded pulse duration modulated or pulse pause modulated reference clock signals (tsr).

The reference oscillator clock signals (ots) are synchronized in phase or, respectively, frequency with network clock signals in the reference clock generator (RTG) with the assistance of an additional reference phase-locked loop. A higher control speed is provided for the phase-locked loop in the clock generator (TG) compared to the control circuit in the reference clock generator (RTG). Also, a higher control speed is provided for the control circuit in the reference clock generator (RTG) compared to the reference phase-locked loop.

The reference clock signals or, respectively, clock signals (tsr, ts) having a lower frequency in comparison to the reference clock signals or, respectively, oscillator clock signals (ots) are tuned in frequency to the control speeds of the phase-locked loops or, respectively, control circuits. Alternatively, the reference clock signals or, respectively, clock signals (tsr, ts) are tuned in frequency to a standardized frame or, respectively, synchronization clock provided for a PCM-suited processing or, respectively, transmission of information.

The individual components of the first and second pulse duration modulation means PDM1, PDM2, of the counter means MC and of the phase measuring means PME, with the exception of the control means, can be realized by standard, integrated circuits due to the elevated processing speeds (for example, the memory means can be commercially available register circuits and other components, as already set forth) or are particularly advantageously realized by custom integrated circuits, that is, application specified integrated circuit ASIC. Since integrated circuits in ASIC technology are available in the interim wherein microprocessor systems are also utilized, a first reference clock generator means or second clock generator means RTG, TG can be completely accommodated in an ASIC circuit.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A method for synchronizing the phase of digital oscillator clock signals that are formed in an oscillator clock means of a clock generator means with digital reference oscillator clock signals that are formed in a reference oscillator clock means of a reference clock generator means, comprising the steps of:

deriving reference clock signals or clock signals having a lower frequency than a frequency of the reference oscillator clock signals or the oscillator clock signals, respectively in the reference clock means or in the clock generator means, respectively, from the reference oscillator clock signals or oscillator clock signals, respectively, using a respective phase locked loop means and a respective processor means, respectively, whereby defined signal edges represent the phase relation of the reference oscillator clock signals or oscillator clock signals, respectively;

in the clock generator means synchronizing the phase of the oscillator clock signals with the reference clock signals communicated to the clock generator means using a phase locked loop formed by a phase measuring means and by a control means;

measuring phase deviations between the reference clock signals and the clock signals that are communicated to the reference clock generator means via at least one connecting line, and forming control information in the reference clock generator means using a control loop formed by a second delay means and a control means, said control means being formed of a controller and a phase measuring means;

controlling with the control information at least one first delay means that is controllable in terms of its delay time and that is inserted into at least one connecting line for communicating the reference clock signals or clock signals such that the phase deviations between the reference clock signals and the clock signals correspond to an n-fold period duration of the reference oscillator clock signals, where n is a whole number;

forming correction information measured in n period durations and representing a phase deviation between the reference clock signals and the clock signals measured within the nth period duration in the control means of the reference clock generator means and forwarding the correction information to the clock generator means; and correcting the phase relations of the reference clock signals and the clock signals in the clock generator means using the control means in the clock generator means according to the communicated correction information.

2. The method according to claim 1, wherein the correction information is communicated by pulse duration modulation of the reference clock signals.

3. The method according to claim 2, wherein the correction information is respectively communicated by m coded pulse duration modulated reference clock signals, where m is a whole number.

4. The method according to claim 1, wherein the reference oscillator clock signals are synchronized in phase with network clock signals in the reference clock generator using an additional reference phase locked loop.

5. The method according to claim 1, wherein a higher response time is provided for the phase locked loop in the clock generator compared to a response time of the control loop in the reference clock generator.

6. The method according to claim 1, wherein a higher response time is provided for the control loop in the reference clock generator compared to a response time of the phase locked loop in the reference clock generator.

7. The method according to claim 1, wherein the reference clock signals or clock signals having a lower frequency in comparison to the reference oscillator clock signals or oscillator clock signals, respectively, are tuned in frequency to the response time of the phase locked loops or control loops.

8. The method according to claim 1, wherein the reference clock signals or clock signals are tuned in frequency to a standardized frame or synchronization clock provided for PCM-suited processing or transmission of information.

9. An arrangement for the implementation of a method for synchronizing the phase of digital oscillator clock signals that are formed in an oscillator clock means of a clock generator means with digital reference oscillator clock signals that are formed in a reference oscillator clock means of a reference clock generator means comprising:

means for deriving reference clock signals or clock signals having a lower frequency than a frequency of the reference oscillator clock signals or the oscillator clock signals, respectively in the reference clock means or in the clock generator means, respectively, from the reference oscillator clock signals or oscillator clock signals using a respective phase locked loop means and a respective processor means, respectively, whereby defined signal edges represent the phase relation of the reference oscillator clock signals or oscillator clock signals, respectively;

in the clock generator means, means for synchronizing the phase of the oscillator clock signals with reference clock signals communicated to the clock generator means using a phase locked loop formed by a phase measuring means and by a control means;

means for measuring phase deviations between the reference clock signals and the clock signals that are communicated to the reference clock generator means via at least one connecting line, and forming control information in the reference clock generator means using a control loop formed of a second delay means and a control means, said control means being formed of a controller and a phase measuring means;

means for controlling with the control information at least one first delay means that is controllable in terms of its delay time and that is inserted into at least one connecting line for communicating the reference clock signals or clock signals such that the phase deviations between the reference clock signals and the clock signals correspond to an n-fold period duration of the reference oscillator clock signals where n is a whole number;

means for forming correction information measured in n period durations and representing a phase deviation between the reference clock signals and the clock signals measured within the nth period duration in the control means of the reference clock generator means and forwarding the correction information to the clock generator means; and means for correcting the phase relations of reference clock signals and the clock signals in the clock generator means using the control means in the clock generator according to the communicated correction information;

the clock generator means having a controllable-frequency, digital oscillator clock means having a control input and having an output for providing the oscillator clock signals; having means for counting the oscillator clock signals having a clock input connected to the output of the frequency controllable digital oscillator clock means, and having counter outputs, on which count results identified in the means for counting are available; having first and second means for pulse duration modulation having respective inputs connected to the counter outputs; having means for phase measuring having a first input connected to the counter outputs; the first means for pulse duration modulation having an output, and the clock generator further having a lowpass filter connecting the output of the first means for pulse duration modulation to the control input of the digital oscillator clock; the second means for pulse duration modulation means having a clock signal output that provides output clock signals; the means for phase measuring having second and third inputs for receiving input clock signals and the oscillator clock signals, respectively; having a means for processing; and having a plurality of memory means connected to said first and second means for pulse duration and to said means for phase measuring for intermediately storing setting information from the means for processing and measuring and result information from the first and second means for pulse duration and from the means for phase measuring, a further intermediate memory connecting each of said memory means to the means for processing.

10. The arrangement according to claim 9, wherein the reference clock generator has a means for phase measuring having an input and a means for pulse duration modulation having an output, the means for phase measuring being coupled to the means for pulse duration modulation in the reference clock generator and wherein a first connecting line connects the clock signal output of the second means for pulse duration modulation of the clock generator to the input of the means for phase measuring of the reference clock generator, and wherein a second connecting line connects the output of the means for pulse duration modulation of the reference clock generator to the second input of the means for phase measuring of the clock generator.

11. The arrangement according to claim 9, wherein the first delay means having a controllable delay time is inserted into one of two connecting lines or is inserted symmetrically distributed into two connecting lines that connect the clock generator means to the reference clock generator means in at least one of the reference clock generator means and the clock generator means.

12. The arrangement according to claim 11, wherein the first delay means is a delay line formed by a plurality of series connected gates of integrated circuits, whereby the number of gates to be respectively connected in series is controlled by the control means.

13. The arrangement according to claim 9, wherein the arrangement further comprises an intermediate memory means of the plurality of memory means, first and second delay means each having at least an input and an output, first trigger circuit having a clock input, a further input and an output, a logic element having first and second inputs and an output, a macro-phase memory means and a finephase memory means of the plurality of memory means each having transfer inputs, multiple inputs, and multiple outputs, and wherein the input of th first delay means forms a second input of the means for phase measuring and is located in the means for phase measuring; wherein, for the purpose of controlling a signal transit time of the first delay means, the first delay means is connected to the intermediate memory means of the plurality of memory means that stores controlling information; wherein the output of the first delay means is connected to the input of the second delay means for the identification of the phase deviation within the nth period duration of the oscillator clock signals, is connected to the further input of the first trigger circuit and is operationally connected to an input of the control means that is connected to the means for phase measuring; wherein the clock input of the first trigger circuit is connected to the output of the oscillator clock; wherein the output of the first trigger circuit is connected via the first input and the output of the logic element to the transfer input of the macrophase memory means of the plurality of memory means for intermediately storing n oscillator clock signal period durations and is connected to the transfer input of the finephase memory means of the plurality of memory means for intermediately storing the phase deviation within the nth oscillator clock signal period duration; wherein the output of the second delay means is connected to the multiple inputs of the fine-phase memory means and wherein the first input of the means for phase measuring is connected to the multiple inputs, respectively of the macro-phase memory means; wherein the multiple outputs of the macro-phase and fine-phase memory means are connected to the control means and wherein the control means has an output operationally connected to the second input of the logic element.

14. The arrangement according to claim 9, wherein the arrangement further comprises a first positive comparator and a second negative comparator in the second means for pules duration modulation, the first positive and second negative comparators each having an output and first and second inputs, first and second memory means of the plurality of memory means and a trigger circuit having a setting input and a reset input and an output, the first inputs of the first and second comparators being connected to the first and second memory means, respectively, and the second inputs of the first and second comparators being connected to the counter outputs of the counter means; and wherein the output of the negative comparator is connected to the setting input of the trigger circuit that forms the pulse duration modulated clock signals on the output of the trigger circuit and the output of the positive comparator is connected to the reset input of the trigger circuit.

15. The arrangement according to claim 9, wherein the clock generator has first and second delay means and wherein the first and second delay means are formed of a delay chain having an input and an output and composed of a plurality of delay elements connected in series; wherein the delay elements are n-channel and p-channel enhancement field effect transistors in integrated CMOS circuit technology and inverters formed therefrom; wherein the inverters have inputs respectively connected to a gate terminal of an n-channel field effect transistor connected to a negative supply voltage via its source terminal and are connected to a gate terminal of a p-channel field effect transistor connected to a positive supply voltage via its drain terminal and the inverters having outputs respectively connected to a drain terminal of the n-channel field effect transistor and to a source terminal of the p-channel field effect transistor;

every delay element being partially formed by a series connection of two inverters and, for the purpose of influencing its delay time,
is inserted either between the p-channel field effect transistors and the positive supply voltage of a respective further p-channel field effect transistor such that a source terminal of the further p-channel field effect transistor is connected to the drain terminal of the p-channel field effect transistor of the inverters, the drain terminals being connected to the positive supply voltage, or is inserted between the n-channel field effect transistors and the negative supply voltage of a respective n-channel field effect transistor such that the drain terminal of the further n-channel field effect transistor is respectively connected to the source terminal of the n-channel field effect transistor of the inverters, the source terminals being connected to the negative supply voltage, and the gate terminals being connected to one another in a delay element as well as to all gate terminals of the respectively other delay elements;

wherein the delay elements are realized in an integrated circuit; and wherein the input and output of the delay chain and the connections between the elements of the delay chain are each respectively connected to a terminal provided for an external connection.

16. The arrangement according to claim 15, wherein the delay chain is followed by a phase comparison element; wherein the phase comparison element is partially formed by first and second series connected inverters and is inserted in the second inverter element respectively between the supply voltage and two further n-channel or p-channel field effect transistors connected serially in a drain-source or source-drain direction; wherein gate terminals of the field effect transistors respectively following the two further n-channel or p-channel field effect transistors of the second inverter element are fed back to the input of the inverter, and gate terminals of the field effect transistors respectively connected to the supply voltage are connected to one another and to the output of the delay chain; wherein a capacitor is inserted between the output of the second inverter element that represents an output of the phase comparison element and the negative supply voltage, and the output of the phase comparison element is directly connected to all gate terminals connected to one another in the delay elements and to a terminal provided for an external connection.

17. A method for synchronizing digital second oscillator clock signals that are formed in an oscillator clock of a second clock generator with digital first reference oscillator clock signals that are formed in a reference oscillator clock of a first reference clock generator, comprising the steps of:
deriving first reference clock signals having a lower frequency than a frequency of the reference oscillator clock signals in the first reference clock generator from the first reference oscillator clock signals using at least a first means for pulse duration modulation and a first means for processing;

deriving second clock signals having a lower frequency than a frequency of the second oscillator clock signals in the second clock generator from the second oscillator clock signals using at least a second means for pulse duration modulation and a second means for processing;

in the second clock generator synchronizing the phase of the second oscillator clock signals to the first reference clock signals communicated to the second clock generator from the first reference clock generator via at least one connecting line using a phase locked loop formed by the second means for phase measuring and by the second means for processing;

measuring phase deviations between the first reference clock signals and the second clock signals that are communicated to the first reference clock generator via at least one connecting line from the second clock generator and forming control information in the first reference clock generator using a control loop formed by the first means for phase measuring and the first means for processing, said control loop also having at least a second means for providing a delay;

controlling with the control information at least one first means for providing a delay that is controllable in terms of its delay time and that is inserted into at least one connecting line for communicating the first reference clock signals or second clock signals such that the phase deviations between the first reference clock signals and the second clock signals correspond to an n-fold period duration of the first reference oscillator clock signals, where n is a whole number;

forming correction information measurred in n period durations and representing a phase deviation between the first reference clock signals and the second clock signals measured within the nth period duration, in the first means for processing of the first reference clock generator and forwarding the correction information to the second clock generator; and correcting the phase relations of the first reference clock signals to the second clock signals in the second clock generator using the second means for processing according to the communicated correction information.

18. The method according to claim 17, wherein the correction information is communicated by pulse duration modulation of the first reference clock signals.

19. The method according to claim 18, wherein the correction information is respectively communicated by m coded pulse duration modulated first reference clock signals, where m is a whole number.

20. The method according to claim 17, wherein the first reference oscillator clock signals are synchronized in phase with network clock signals in the first reference clock generator using an additional reference phase locked loop.

21. The method according to claim 17, wherein a higher response time is provided for the phase locked loop in the second clock generator compared to a response time of the control loop in the first reference clock generator.

22. The method according to claim 17, wherein a higher response time is provided for the control loop in the first reference clock generator compared to a response time of a first reference phase locked loop in the first reference clock generator.

23. The method according to claim 17, wherein the first reference clock signals or second clock signals having a lower frequency in comparison to the first reference oscillator clock signals or oscillator clock signals, respectively, are tuned in frequency to the response time of the phase locked loops or control loops.

24. The method according to claim 17, wherein the first reference clock signals or second clock signals are tuned in frequency to a standardized frame or synchronization clock provided for a PCM-suited processing or transmission of information.

25. An arrangement for use in synchronizing the phases of digital oscillator clock signals, comprising a clock generator: having a frequency controllable digital oscillator clock means having a control input and having an output for providing oscillator clock signals; having means for counting the oscillator clock signals having a clock input connected to the output of the frequency controllable digital oscillator clock means, and having counter outputs, on which count results identified in the means for counting are available; having first and second means for pules duration modulation having respective inputs connected to the counter outputs; having means for phase measuring having a first input connected to the counter outputs; the first means for pulse duration modulation having an output, an the clock generator further having a lowpass filter connecting the output of the first means for pulse duration modulation to the control input of the digital oscillator clock; the second means for pulse duration modulation means having a clock signal output that provides output clock signals; the means for phase measuring having second and third inputs for receiving input clock signals and the oscillator clock signals, respectively; having a means for processing; and having a plurality of memory means connected to said first and second means for pulse duration and to said means for phase measuring for intermediately storing setting information from the means for processing and measuring and result information from the first and second means for pulse duration and from the means for phase measuring, a further intermediate memory connecting each of said memory means to the means for processing.

26. The arrangement according to claim 25, wherein the arrangement further comprises a further clock generator having a means for phase measuring having an input and having a means for pulse duration modulation having an output, the means for phase measuring being coupled to the means for pulse duration modulation in the further clock generator and wherein a first connecting line connects the clock signal output of the second means for pulse duration modulation of the clock generator, defined as a reference clock generator, to the input of the means for phase measuring of the further clock generator and wherein a second connecting line connects the output of the means for pulse duration modulation of the further clock generator to the second input of th means for phase measuring of the reference clock generator.

27. The arrangement according to claim 26, wherein a first delay means for providing a controllable delay time is inserted into one of the first and second connecting lines or is inserted symmetrically distributed into both first and second connecting lines in the reference clock generator and/or the further clock generator.

28. The arrangement according to claim 27, wherein the arrangement further comprises an intermediate memory means of the plurality of memory means, a second delay means having an input and an output, a first trigger circuit having a clock input, a further input and an output, a logic element having first and second inputs and an output, a macrophase memory means and a fine-phase memory means of the plurality of memory means each having transfer inputs, multiple inputs, and multiple outputs, and the first delay means having an input and an output, and wherein the first delay means forms a second input of the means for phase measuring means and is located in the means for phase measuring; wherein, for the purpose of controlling a signal transit time of the first delay means, the first delay means is connected to the intermediate memory means of the plurality of memory means that stores controlling information; wherein the output of the first delay means is connected to the input of the second delay means for the identification of the phase deviation within the nth period duration of the oscillator clock signals, is connected to the further input of the first trigger circuit an is operationally connected to an input of the means for processing; wherein the clock input of the first trigger circuit is connected to the output of the oscillator clock; wherein the output of the first trigger circuit is connected via the first input and the output of the logic element to the transfer input of the macro phase memory means of the plurality of memory means for intermediately storing n oscillator clock signal period durations and is connected to the transfer input of the fine-phase memory means of the plurality of memory means for intermediately storing the phase deviation within the nth oscillator clock signal period duration; wherein the output of the second delay means is connected to the multiple inputs of the fine-memory means and to the multiple inputs of the macro-phase memory means; wherein the multiple outputs of the macro-phase and fine-phase memory means are operationally connected to the means for processing and wherein the means for processing has an output operationally connected to the second input of the logic element.

29. The arrangement according to claim 25, wherein the arrangement further comprises a first positive comparator and a second negative comparator in the second means for pulse duration modulation, the first positive and second negative comparators each having an output, and first and second inputs, first and second memory means of the plurality of memory means and a trigger circuit having a setting input and a rest input and an output, the first inputs of the first and second comparators being connected to the first and second memory means of the plurality of memory means, respectively, and the second inputs of the first and second comparators being connected to the counter outputs of the means for counting; and wherein the output of the negative comparator is connected to the setting input of the trigger circuit that forms the output clock signals on the output of the trigger circuit and the output of the positive comparator is connected to the reset input of the trigger circuit.

* * * * *